July 1, 1969   G. F. BRUNNER   3,452,848
OIL CLUTCH COOLING APPARATUS

Filed Feb. 23, 1968

INVENTOR
GERALD F. BRUNNER

BY
Fryer, Tjensvold, Feix, Phillips & Lempio
ATTORNEYS

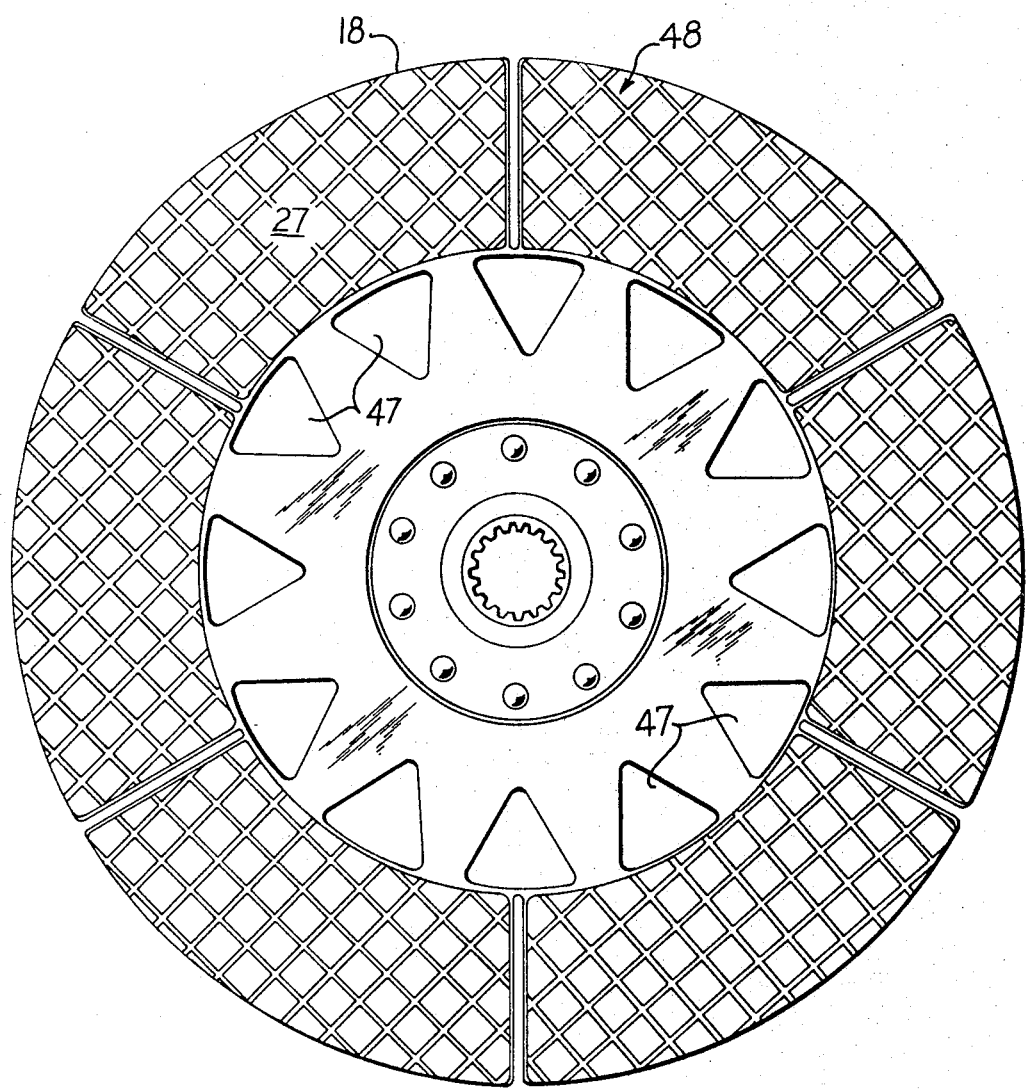

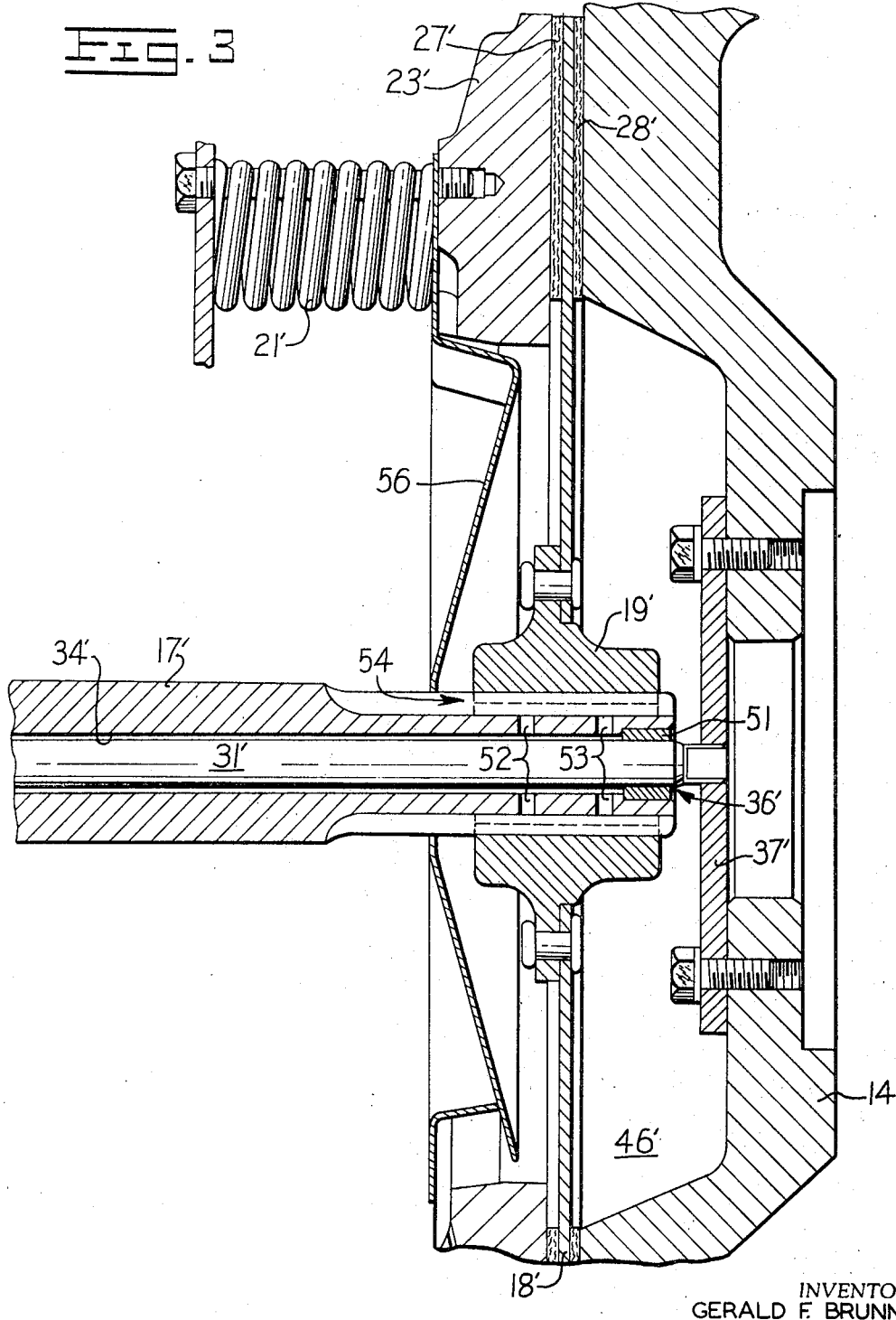

United States Patent Office 3,452,848
Patented July 1, 1969

3,452,848
OIL CLUTCH COOLING APPARATUS
Gerald F. Brunner, Kirtland, Ohio, assignor to Towmotor Corporation, Cleveland, Ohio, a corporation of Ohio
Filed Feb. 23, 1968, Ser. No. 707,622
Int. Cl. F16d 13/72, 47/04
U.S. Cl. 192—113
7 Claims

ABSTRACT OF THE DISCLOSURE

Apparatus for providing oil to an oil-cooled clutch positioned between an engine flywheel and a transmission where a drive shaft for an oil pump is connected to the flywheel through an axial bore in the output shaft from the clutch. Oil from the pump is transferred to the clutch through a concentric passage formed between the pump shaft and the axial bore of the clutch shaft.

---

Oil-cooled clutches employ a constant flow of oil during operation to transfer heat away from the friction facing material on their clutch plates. In the prior art, an oil pump is commonly gear-driven or belt-driven and directs oil towards the facing material through conduits directed generally at the clutch plate. Such arrangements have been found to be relatively expensive and inefficient. For example, the drive components increase capital costs as well as assembly time and repair time. Where the oil pump is belt-driven, adjustment means must be provided to maintain proper tension upon the belt. Also, with the oil being directed towards the clutch plate through tubes, much of the oil is misdirected so that increased amounts of oil must be circulated to provide sufficient cooling. The additional oil tends to be churned by contact with various rotating components which results in the generation of additional heat so that an oil cooler is commonly required to maintain the cooling oil at a proper temperature. With the pump necessarily located at a relatively remote location from the clutch, hoses or tubing used to transfer the oil to and from the pump add to the complexity of such assemblies. The use of such tubing also adversely affects the suction lift of the pumping system so that the pump tends to run dry when not in use and requires priming after sitting idle for any length of time.

The present invention provides cooling apparatus which overcomes the above problems. The fluid pump is driven in a mechanically simple manner by a shaft passing through an axial bore in the output shaft of the clutch. The axial bore of the clutch shaft is larger than the pump drive shaft so that they form a generally concentric passage through which fluid from the pump is directed to the In this manner, the driving apparatus for the pump is substantially simplified in that only a single shaft is employed. Tubing for transferring fluid from the pump to the clutch is unnecessary. Fluid is more accurately directed towards those parts of the clutch requiring cooling so that the amount of fluid to be circulated is reduced. With the present arrangement, there is also less tendency of the fluid to be heated as by churning so that the need for an external oil cooler may be completely obviated. The pump is positioned closer to the clutch so that an adequate flow of fluid is provided immediately after engine start-up whether or not the clutch is engaged. Further, the lower requirement of oil increases pump life due to the lower circulation rate required.

Other advantages of the present invention are made apparent from the following description having reference to the accompanying drawings wherein:

FIG. 2 is a view of one side of the driven clutch plate; and

FIG. 3 is an enlarged partial illustration of the assembly in FIG. 1 and including an alternate embodiment of the apparatus shown in FIG. 1.

Figure 1:
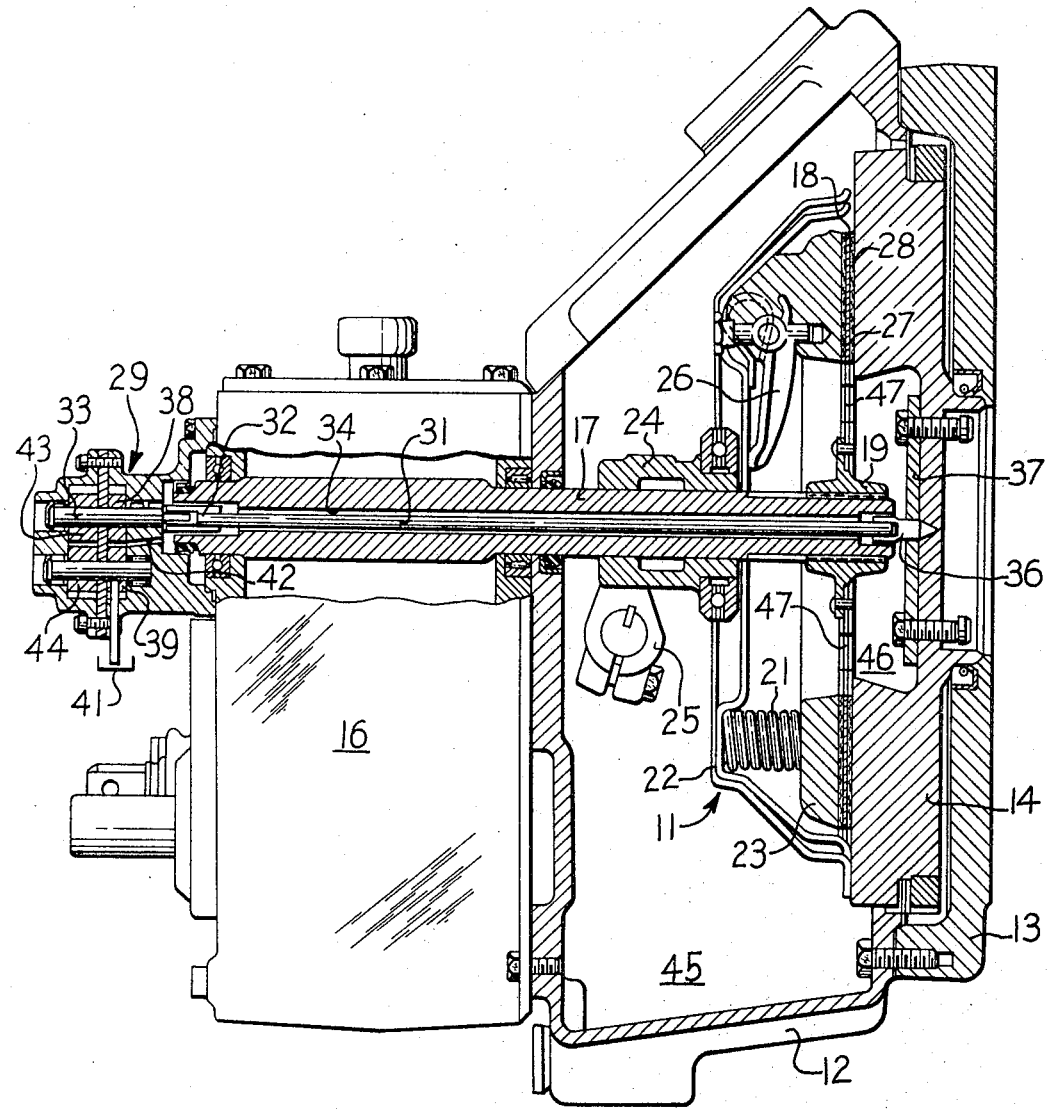
FIG. 1 is a side view in elevation, with parts in section, of an oil-cooled clutch employing the present cooling apparatus.

An oil-cooled clutch, indicated at 11 in FIG. 1, is mounted within a clutch housing 12 which is secured to a flywheel housing 13 of an engine (not shown). The engine has a flywheel 14 which provides power to a suitable transmission, indicated generally at 16, through the clutch 11 and its output shaft 17. A clutch plate 18 is secured to one end of the clutch shaft adjacent the flywheel by means of a mounting 19 which is splined onto the clutch shaft. The clutch is of a conventional type wherein thrust springs, one of which is indicated at 21, interact between the clutch cover 22 and a pressure plate 23 to urge the pressure plate against the clutch plate 18 and force the clutch plate into driving engagement with the flywheel 14. The clutch is disengaged by operation of a clutch pedal (not shown) through a rotatable lever 25 which causes a release bearing 24 to operate release levers, one of which is indicated at 26. Operation of the release levers overcomes the spring pressure on the driven plate 18 and permits the flywheel to rotate freely. When the pedal is released, the bearing moves away from the release levers thus allowing the spring pressure to be applied to the pressure plate for re-engagement of the clutch. Friction facing material, indicated at 27 and 28, is disposed upon each side of the driven clutch plate for engagement with the pressure plate 23 and the flywheel 14 respectively. A suitable cooling fluid such as oil is employed to remove heat generated on the friction surfaces by engagement of the facing material with the pressure plate and with the flywheel.

To provide oil for cooling of the clutch according to the present invention, a dual stage geared oil pump 29 is disposed adjacent the transmission at one end of the clutch shaft 17 opposite the clutch assembly and flywheel. To drive the pump according to operation of the engine, a quill shaft 31 is secured at one end 32 to the drive shaft 33 of the pump 29. The quill shaft passes through an axial bore 34 in the clutch shaft with its other end 36 being secured to a drive plate 37 mounted for rotation upon the flywheel. The pump has a first pair of gears 38 and 39 which transfer oil from a tank 41 through a passage 42 into the axial bore of the clutch shaft. A second pair of pump gears 43 and 44 are driven by the same pump shaft 33 and transfer oil from the clutch sump, indicated at 45, to the oil tank 41 through suitable conduits (not shown). The axial bore 34 of the clutch shaft 17 is larger than the pump drive shaft 31 to form a concentric passage which communicates oil from the pump outlet passage 42 to a recessed area 46 in the flywheel at the other end of the clutch shaft. Oil exiting from the concentric passage in the clutch shaft is carried by centrifugal force to the periphery of the flywheel recess from where it flows between the friction face surface 28 and the flywheel to provide suitable cooling. To permit a portion of the oil in the flywheel recess to cool the friction surface 27 adjacent the clutch pressure plate, the driven clutch plate 18 has a plurality of cut-outs 47 adjacent the periphery of the flywheel recess so that oil from the recess may pass therethrough and across the friction surfaces 27. The cut-outs 47 are more clearly illustrated in FIG. 2. Having particular reference to FIG. 2, the friction surface 27 (as well as the reverse friction surface 28) is formed with a plurality of radial grooves indicated at 48, to permit relatively free passage of the oil across the friction surfaces during engagement of the clutch. Oil which passes through the clutch to provide cooling is collected in the clutch sump 45 and returned to the oil tank 41 by means of the pump gears 43 and 44 described above.

FIG. 3 includes an enlarged view of the clutch plate mounted on one end of the clutch shaft and shows adjacent portions of the clutch assembly and flywheel. Components indicated by primed numerals are generally similar to those shown in FIG. 1. The arrangement in FIG. 3 is illustrative of an alternate embodiment for transferring oil from the axial passage 34' in the clutch shaft to both friction surfaces 27' and 28' of the driven clutch plate 18'. A suitable plug 51 closes off the concentric passage between the axial clutch shaft bore 34' and the pump drive shaft 31' adjacent the flywheel. A set of circumferentially spaced outlet passages, one of each set indicated at 52 and 53, are radially drilled in the clutch shaft 17, generally adjacent each end of the mounting 19' for the driven clutch plate. By this arrangement, oil from the axial bore 34' passes in each direction along the spline connection 54 between the mounting 19' and the clutch shaft to provide cooling fluid upon each side of the driven clutch plate. As the oil exits from passages at each end of the spline connection, it is carried outwardly by centrifugal force so that a portion of the oil is collected in the periphery of the flywheel recess 46' as discussed above with respect to FIG. 1 and passes across the friction facing 28'. A generally equal amount of oil exits from the opposite end of the spline connection and is carried outwardly by centrifugal force against a generally conical deflector 56. The conical deflector directs the oil outwardly to pass between the friction facing 27' and the pressure plate 23' to provide suitable cooling. With this arrangement, the driven clutch plate 18' may be of solid construction to provide greater strength in that member since there is no need for the cut-outs as indicated at 47 in FIGS. 1 and 2. Thus the present invention provides two embodiments of apparatus for simply and efficiently providing oil to the oil-cooled clutch.

I claim:

1. Apparatus for providing fluid to a hydraulically cooled clutch assembly associated with motor means comprising a fluid pump having its drive shaft connected to the motor means, the pump drive shaft passing through an axial bore of an output shaft for the clutch, the axial bore being larger than the pump drive shaft to define a generally concentric passage therebetween, the pump having a fluid outlet in communication with the clutch by means of the concentric passage between the pump drive shaft and the axial bore of the clutch shaft.

2. The invention of claim 1 wherein a clutch plate which is to engage and be driven by the motor means is mounted on the clutch shaft, fluid from the pump to be directed toward the clutch plate.

3. The invention of claim 2 wherein the pump is of a two stage type, one stage to transfer fluid from a sump in the clutch assembly to a fluid tank and the other stage to transfer fluid from the tank to the clutch through the concentric passage in the clutch shaft.

4. The invention of claim 2 wherein the pump drive shaft is connected to a flywheel which is to be selectively engaged by the clutch plate, the flywheel being recessed to receive fluid from the concentric passage in the clutch shaft and transfer it to the clutch plate for cooling of its facing material.

5. The invention of claim 4 wherein a pressure plate is operable to urge the clutch plate against the flywheel, the clutch plate having facing material on each side for respective frictional engagement with the pressure plate and the flywheel.

6. The invention of claim 5 wherein the clutch plate has a plurality of cut-outs for transferring a portion of fluid in the flywheel recess to the facing material between the clutch plate and pressure plate.

7. The invention of claim 5 further comprising means for communicating fluid from the concentric passage to each side of the clutch plate and deflector means for directing a portion of the fluid toward the clutch plate facing material adjacent the pressure plate, the surface of the facing material on each side of the clutch plate being configured to permit passage of fluid thereacross during engagement of the clutch.

References Cited

UNITED STATES PATENTS

| 2,498,123 | 2/1950 | Hobbs | 192—113.2 |
| 2,659,468 | 11/1953 | Hobbs | 192—113.2 |
| 3,249,189 | 5/1966 | Schjolin | 192—113.2 XR |

BENJAMIN W. WYCHE, III, *Primary Examiner.*

U.S. Cl. X.R.

192—107